United States Statutory Invention Registration [19]

[11] Reg. Number: H646

Tsui [43] Published: Jun. 6, 1989

[54] WIDEBAND SELF MIXING MILLIMETER WAVE RECEIVER

[75] Inventor: James B. Y. Tsui, Centerville, Ohio

[73] Assignee: The United States of America as represented by the Secretary of the Air Force, Washington, D.C.

[21] Appl. No.: 46,752

[22] Filed: May 7, 1987

[51] Int. Cl.[4] ..... H01Q 1/36; H04B 1/26

[52] U.S. Cl. ..... 343/895; 343/700 MS; 455/321

[58] Field of Search ..... 343/700 MS, 70, 854; 455/321

[56] References Cited

U.S. PATENT DOCUMENTS

| | | | |
|---|---|---|---|
| 3,246,245 | 4/1966 | Turner | 455/293 |
| 3,296,536 | 1/1967 | Copeland et al. | 455/107 |
| 3,509,465 | 4/1970 | Andre et al. | 455/282 |
| 3,949,407 | 4/1976 | Jagdmann et al. | 343/895 |
| 4,251,817 | 2/1981 | Kimurz et al. | 343/700 MS |
| 4,287,603 | 9/1981 | Moser | 455/293 |
| 4,319,248 | 3/1982 | Flam | 343/701 |
| 4,342,009 | 7/1982 | Dixon, Jr. | 455/321 |
| 4,368,472 | 1/1983 | Gandhi | 343/718 |
| 4,573,212 | 2/1986 | Lipsky | 343/895 |

*Primary Examiner*—Thomas H. Tarcza
*Assistant Examiner*—Linda J. Wallace
*Attorney, Agent, or Firm*—Bernard E. Franz; Donald J. Singer

[57] ABSTRACT

A self-mixing antenna-mixer millimeter wave receiver has the local oscillator and the mixer combined in one single unit, using a Gunn diode (or other device) placed at the center of a spiral antenna and proper voltage applied, so that the diode becomes an oscillator. At the same time the diode will function as a mixer for the input signals received by the spiral antenna. The IF frequency from the mixer can be amplified and detected for further processing. Only a dc power supply is required to feed the diode at the center of the antenna.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OSCILLATOR AND MIXER

WIDEBAND SELF MIXING MILLIMETER WAVE RECEIVER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a wideband self mixing millimeter (MM) wave receiver, and more particularly to a receiver combined with a spiral type antenna.

To provide wide band coverage at mm wave frequencies, antenna detectors (antector) and antenna mixers have been pioneered by several engineers. The basic approach of an antenna detector is to use a diode detector mounted at the center of a spiral antenna, which covers a wide frequency range. This kind of receiver is very small in size, but the sensitivity of the receiver is low, typically −30 to −40 dBm. The antenna mixer approach uses a mixer at the center of the spiral antenna. The output of the receiver will be at an intermediate frequency (IF) where an amplifier can be added to improve the sensitivity. Although this approach can improve the sensitivity of the receiver, it also increases the size of the receiver because a local oscillator is needed.

U.S. Patents of interest include U.S. Pat. No. 4,287,603 to Moser, which discloses a radiated input mixer for converting a radio frequency signal to an intermediate frequency signal with the aid of a local oscillator signal. U.S. Pat. No. 4,319,248 to Flam discloses an integrated detector device sensitive over a broad band of frequencies. U.S. Pat. No. 3,246,245 to Turner and U.S. Pat. No. 3,296,536 to Copeland et al each disclose a combined spiral antenna and converter circuit. U.S. Pat. No. 4,368,472 to Ghandi discloses a dosimeter which includes a spiral antenna and a schottky diode. U.S. Pat. No. 3,509,465 to Andre et al discloses a spiral antenna having an amplifier and bias feed circuits integrated therein. U.S. Pat. No 3,949,407 to Jagdmann et al discloses a direct fed spiral antenna element array.

SUMMARY OF THE INVENTION

An objective of the invention is to provide a millimeter wave receiver having small size and high sensitivity.

A self-mixing antenna-mixer millimeter wave receiver according to the invention has the local oscillator and the mixer combined in one single unit, for example, using a Gunn diode placed at the center of a spiral antenna and proper voltage applied, so that the diode becomes an oscillator. At the same time the diode will function as a mixer for the input signals received by the spiral antenna. The IF frequency from the mixer can be amplified and detected for further processing. Only a dc power supply is required to feed the diode at the center of the antenna.

DETAILED DESCRIPTION

I. Antenna Detector (Antector)

Figure 1:
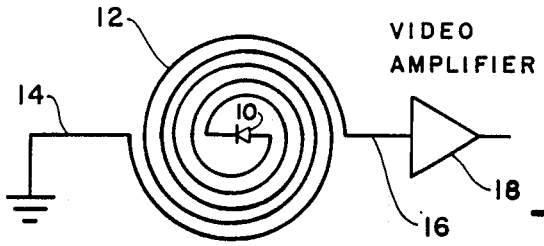
Fig. 1 PRIOR ART
FIG. 1 is a schematic and functional block diagram of a prior art basic antenna-detector (antector) circuit.

As shown in FIG. 1, a typical prior art antenna-detector type circuit uses a diode detector 10 mounted at the center of a spiral antenna 12. The spiral antenna covers a wide frequency range, typically several octaves. The diode 10 is mounted at the two inner terminals (typically the feed point) of the spiral antenna 12. One outer terminal 14 of the antenna is connected to ground. The other outer terminal 16 of the antenna is connected to the input of a video amplifier 18. The input signal is detected by the detector 10 and converted to a video signal. The video amplifier 18 will amplify this signal for further processing. This arrangement forms a wide band crystal video receiver with a sensitivity of −30 to −40 dBm. Because RF amplifiers covering a wide frequency range are not available, the sensitivity of this receiver is determined by the performance of the detector and the video amplifier. This type of receiver has the advantage of low cost and small size which are critical for many applications, such as in tactical aircraft.

II. Antenna Mixer

Figure 2:
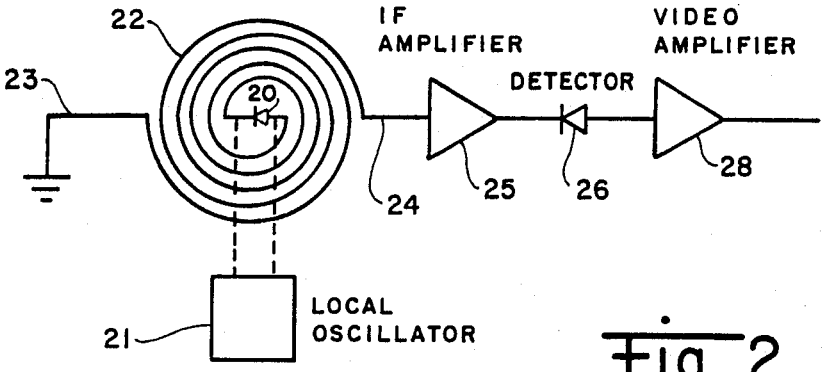
Fig. 2 PRIOR ART
FIG. 2 is a schematic and functional block diagram of a prior art basic antenna-mixer circuit.

In order to significantly improve the sensitivity of the antector receiver of FIG. 1, amplification must be provided before the detector. The center diode 20 can be used as a mixer rather than a detector, as shown in FIG. 2. A local oscillator 21 (LO) must be added, and the output of the local oscillator is applied to the diode mixer 20. The input signal will mix with the local oscillator frequency and be downconverted to an intermediate frequency (IF). If the IF is kept under 20 GHz, a conventional amplifier 25 can be used to amplify the output before the detector 26 to improve the sensitivity of the receiver. There are many approaches for coupling LO power into the mixer diode, such as feed through fin lines, suspended striplines, and through a cavity resonator. The additional local oscillators and feed network required increase the complexity of the receiver design. There are also many approaches for coupling the IF signal out of the mixer.

III. Self-Mixing Antenna Mixer Scheme

Although the antenna mixer approach of FIG. 2 can improve the sensitivity of the millimeter (MM) wave receiver as compared with the antenna detector scheme of FIG. 1, the antenna mixer is more complicated in structure. Adding a local oscillator and the necessary feeding circuits will certainly increase the size of the receiver. In the novel self-mixing antenna mixer circuit shown in basic form FIG. 3, the local oscillator and the mixer will be combined in one single unit. For example, if a Gunn diode 30 is placed at the center of a spiral antenna and proper voltage is applied from a direct-current supply 31, the diode 30 will become an oscillator. At the same time, the diode 30 will function as a mixer for the input signals received by the spiral antenna 32. The IF frequency from the mixer can be amplified and detected for further processing. There are many different ways for coupling the IF signal out of the mixer.

One typical form for the antenna 32 comprises spiral strip lines with a ground plane on a printed circuit type board. The direct current can then be fed via conductors extending through holes through the ground plane and the board.

Figure 3:
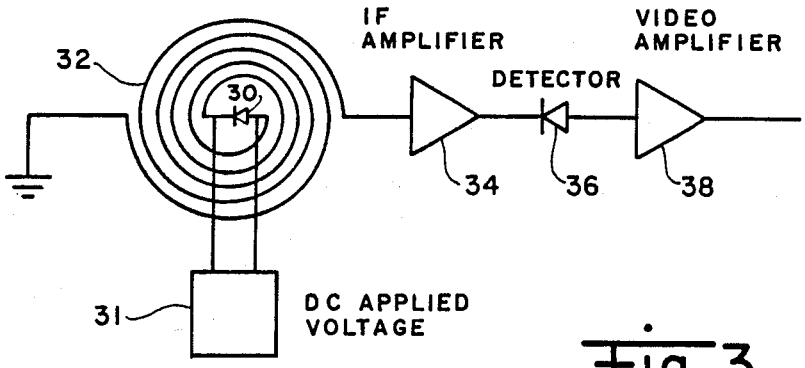
FIG. 3 is a schematic and fuctional block diagram of a basic self-mixing antenna-mixer millimeter wave receiver circuit.

The approach shown in FIG. 3 will eliminate the local oscillator unit of FIG. 2 and all of the RF circuit required to couple the local oscillator to the mixer at the center of the antenna. Only a dc power supply is required to feed the diode in the center of the antenna. The size of the self-mixing approach can be potentially very small due to the simplification of the design, and at the same time maintains the high sensitivity.

It is understood that certain modifications to the invention as described may be made, as might occur to one with skill in the field of the invention, within the scope of the appended claims. For example, other type diodes, or devices having more than two terminals, might be used in place of the Gunn diode. Therefore, all embodiments contemplated hereunder which achieve the objects of the present invention have not been shown in complete detail. Other embodiments may be developed without departing from the scope of the appended claims.

What is claimed is:

1. A self-mixing antenna-mixer millimeter wave receiver having a local oscillator and a mixer combined in a single unit, comprising a spiral antenna having two arms, each having an inner end and an outer end, a Gunn diode having two terminals connected directly to the inner ends of the two arms at the center of the spiral antenna, means for coupling a source of direct current to the two terminals of said diode via leads used only for the direct current and connected directly to the inner ends of the two arms at the center of the spiral antenna, so that the diode becomes an oscillator, and at the same time the diode functions as a mixer for input signals received by the spiral antenna.

2. A receiver according to claim 1, wherein the outer end of one of the arms of the spiral antenna is connected to ground, and the outer end of the other arm is coupled to an IF amplifier, a detector, and a video amplifier in tandem, so that an IF frequency from the mixer can be amplified and detected for further processing.

3. A self-mixing antenna-mixer millimeter wave receiver having a local oscillator and a mixer combined in a single unit, comprising a spiral antenna having two arms, each having an inner end and an outer end, a semiconductor device having at least two terminals connected directly to the inner ends of the two arms at the center of the spiral antenna, means for coupling a source of direct current to said device via leads used only for the direct current and connected directly to the inner ends of the two arms at the center of the spiral antenna, so that the device becomes an oscillator, and at the same time the device functions as a mixer for input signals received by the spiral antenna.

4. A receiver according to claim 3, wherein said semiconductor device is a Gunn diode.

* * * * *